Figure 1:
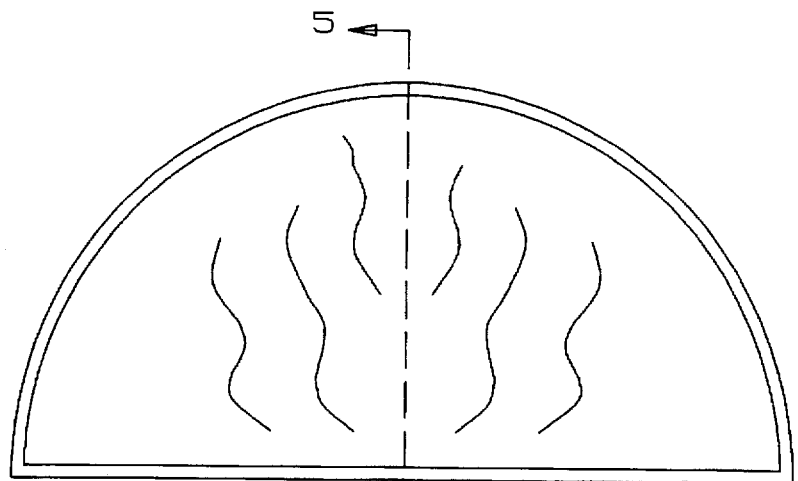

United States Patent
Pelham et al.

Patent Number: 5,749,314
Date of Patent: May 12, 1998

[54] COVERED DOG BED

[76] Inventors: Marilyn M. Pelham, 7204 Mignonette, Bakersfield, Calif. 93308; Richard T. Hollar, 1010 33rd St., Bakersfield, Calif. 93301

[21] Appl. No.: 753,747

[22] Filed: Nov. 29, 1996

[51] Int. Cl.⁶ .................................................. A01K 1/035
[52] U.S. Cl. .................................................. 119/28.5
[58] Field of Search ........................ 119/28.5; 5/694, 5/737, 739

[56] References Cited

U.S. PATENT DOCUMENTS

| | | | |
|---|---|---|---|
| D. 368,335 | 3/1996 | St. John | 119/28.5 X |
| 1,879,473 | 9/1932 | Pittsd | 119/28.5 X |
| 2,854,948 | 10/1958 | Drayson | 119/28.5 X |
| 3,989,008 | 11/1976 | Neumann | 119/28.5 |
| 4,169,428 | 10/1979 | Chamblee | 119/482 |
| 5,000,116 | 3/1991 | Fife | 119/28.5 |
| 5,010,843 | 4/1991 | Henry | 119/28.5 |
| 5,072,694 | 12/1991 | Haynes | 119/482 |
| 5,282,439 | 2/1994 | Oaks | 119/482 |
| 5,327,851 | 7/1994 | Pare | 119/482 |
| 5,357,901 | 10/1994 | Batts | 119/28.5 |

*Primary Examiner*—Gene Mancene
*Assistant Examiner*—Yvonne R. Abbott
*Attorney, Agent, or Firm*—Robert M. Sperry

[57] ABSTRACT

A resting place for dogs or other pets consisting of a padded bottom covered in a soft or furry material, with a permanently attached blanket or cover to keep the animal warm. The blanket or cover being attached on three of it's four sides permanently to the padded bottom, if it is of square or rectangular shape, or 75 percent of it's circumference if it is of rounded or oval shape. The fourth unattached portion of the blanket or cover having a spring or springly member sewn into it's edge to hold that portion of the blanket or cover open to provide easy access onto the padded bottom by the animal.

4 Claims, 2 Drawing Sheets

5,749,314

COVERED DOG BED

BACKGROUND—FIELD OF INVENTION

This invention relates to a bed or resting place for dogs and other pets.

BACKGROUND—DESCRIPTION OF PRIOR ART

A common problem with dog and pet beds is providing a blanket or cover for the animal that will stay in place and give the animal an easy way to keep itself covered.

The Dog Bed in U.S. Pat. No. 3,989,008 shows a bed having a similar function, but is of quite complex design and difficult to disassemble for cleaning.

The Pet Sleeping Bag in U.S. Pat. No. 4,169,428 also has a similar function, but lacks the ease of entry into the bag.

The Self Covering Pet Bed in U.S. Pat. No. 5,000,116 also serves a similar function but also is of quite different design, has no means of remaining open for ease of entry and would be difficult, if possible, to disassemble for cleaning.

The Pet Bed in U.S. Pat. No. 5,010,843 also serves to keep the pet covered but still has no permanent opening for easy access inside.

The Pet Bed and Enclosure in U.S. Pat. No. 5,072,694 provides easy access, but does not collapse around the pet like a blanket.

The Pet Enclosure in U.S. Pat. No. 5,282,439 suffers from the same problems as the previously cited art.

The Animal Sleeping Bag in U.S. Pat. No. 5,327,851 looks very similar but is designed for hampsters and guinea pigs etc, and still lacks the structure for keeping the entry open.

The Pet Comforter in U.S. Pat. No. 5,357,901 looks to serve the same purpose i.e. keep the pet covered, but does not have the same stability.

OBJECTS AND ADVANTAGES

Accordingly, there are several objects and advantages of our invention. The object to this design is to provide a comfortable bed for the dog or pet to sleep or rest upon, to provide a blanket to keep the animal covered that is secured in place, and to provide easy access onto the bed and under the blanket. It's one piece design requires no assembly or disassembly for cleaning and can be machine washed.

DRAWING FIGURES

FIGS. 1 through 5 show various aspects of the Covered Pet Bed.

Figure 2:
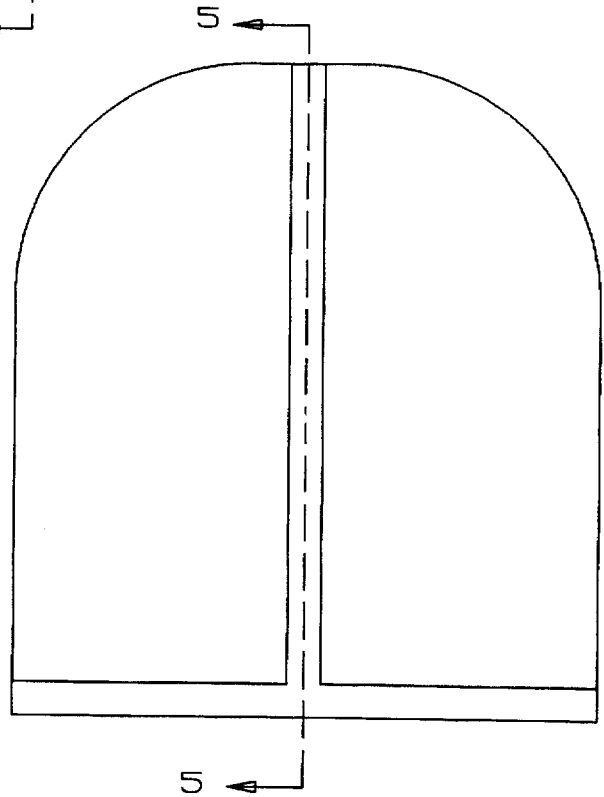
Figure 3:
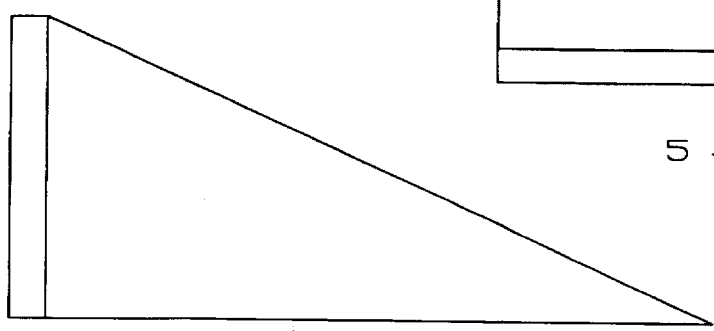
Figure 4:
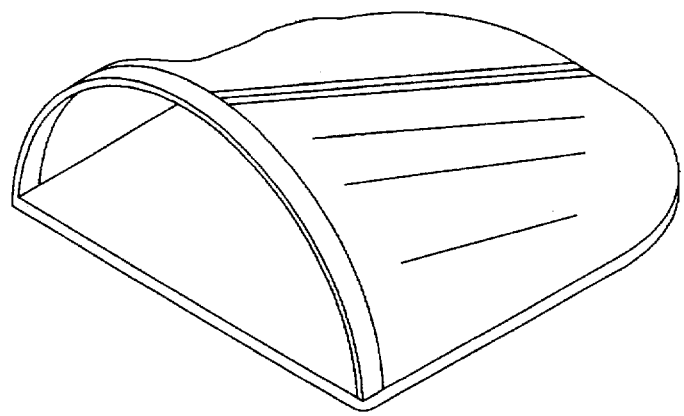
Figure 5:
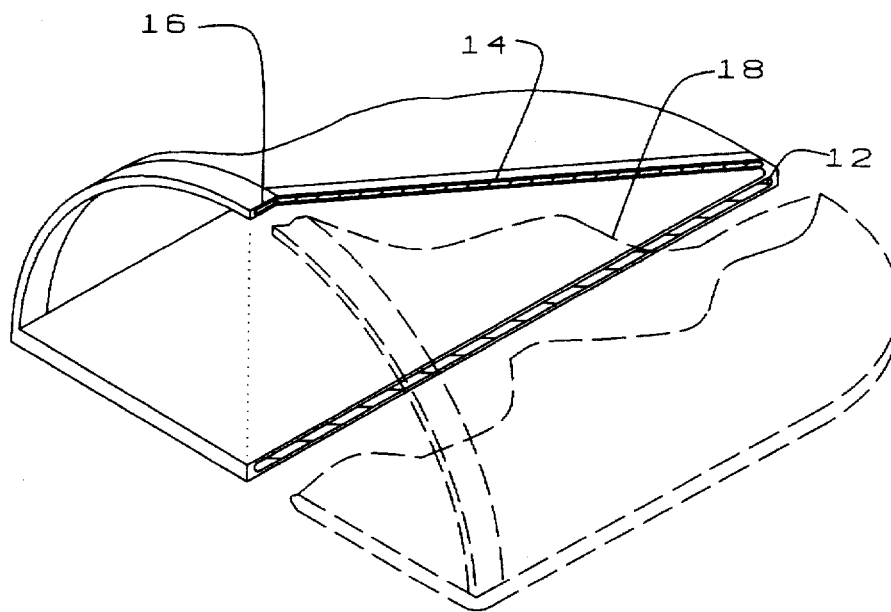

FIG. 1 shows a front view.
FIG. 2 shows a top view.
FIG. 3 shows a side view.
FIG. 4 shows a perspective drawing.
FIG. 5 shows and cut-away drawing.

REFERENCE NUMERALS IN THE DRAWING 12 pad
14 covering material
16 supporting member
18 pleats (gathers)

DESCRIPTION—FIGS. 1 TO 4

A typical embodiment of the present invention is illustrated in FIGS. 1 through 4. The bed has a soft pad consisting of an approximately 1 inch layer of foam rubber or other soft pad 12 (FIG. 4), sewn permanently between two layers of the covering material 14 and incorporating a strip of ⅛ inch thick hi impact syrene 16 or other springlike material for the purpose of holding the entrance open. The covering material 14 is also gathered 18 at the rear of the bed to provide extra covering and room for different sizes of animals.

OPERATION

The manner of use of this invention is simply for the dog or pet to walk through the open end to rest while automatically staying covered. Also in warmer weather, the animal can simply sleep on top of the bed.

SUMMARY, RAMIFICATIONS AND SCOPE

Accordingly the reader will see that this invention allows for a comfortable resting place, has a soft covering to keep the animal warm during cooler weather, allows easy access under the blanket or covering, and is easily cleaned.

Although this description above contains many specificities, these should not be construed as limiting the scope of the invention but as merely providing illustrations of the presently preferred embodiment of this invention. For example, the overall shape of the pad can be of different shapes such as square, rectangular or circular. Thus the scope of this invention should be determined by the appended claims and their legal equivalents, rather than by the examples given.

I claim:
1. A pet bed comprising:
   a bottom member formed of cushioning material and configured to receive a pet in a sleeping position,
   a blanket covering said bottom member and forming an overlying layer above said bottom member, said blanket being secured to said bottom member about approximately 75% of the periphery of said bed to define an entrance portion, and
   a semi-rigid flexible non-metallic member, secured to said bottom member forming an arch about said entrance portion and serving to support an edge portion of said blanket to define a doorway for said pet.
2. The pet bed of claim 1 wherein:
   said semi-rigid member is formed of washable material.
3. The pet bed of claim 1 wherein:
   said semi-rigid member is formed of styrene.
4. The pet bed of claim 1 wherein:
   said blanket is formed of high nap material.

* * * * *